United States Patent [19]

Schwob

[11] Patent Number: 4,585,194

[45] Date of Patent: Apr. 29, 1986

[54] RETRACTABLE WINDER FOR STORING THE POWER CORD OF AN ELECTRIC FLAT-IRON AND AN ELECTRIC FLAT-IRON EQUIPPED WITH A WINDER OF THIS TYPE

[75] Inventor: Pierre Schwob, Lyons, France

[73] Assignee: SEB S.A., Selongey, France

[21] Appl. No.: 570,197

[22] Filed: Jan. 12, 1984

[30] Foreign Application Priority Data

Jan. 19, 1983 [FR] France ............................... 83 00765

[51] Int. Cl.⁴ ................................................ F16L 3/00
[52] U.S. Cl. ..................................... 248/52; 191/12.4; 242/85.1; 339/147 C
[58] Field of Search ......................... 248/52, 75, 117.1; 339/119 C, 147 C; 191/12.4; 242/73, 85.1

[56] References Cited

U.S. PATENT DOCUMENTS

| | | | |
|---|---|---|---|
| 2,536,776 | 1/1951 | Smellie | 242/85.1 |
| 2,553,097 | 5/1951 | Lampe | 242/85.1 |
| 2,697,574 | 12/1954 | Bricker | 248/150 X |
| 3,111,753 | 11/1963 | Seibold | 191/12.4 X |
| 3,290,453 | 12/1966 | Jensen | 191/12.4 |
| 3,689,868 | 9/1972 | Snyder . | |
| 3,830,445 | 8/1974 | Moore | 242/73 X |

FOREIGN PATENT DOCUMENTS

| | | |
|---|---|---|
| 746978 | 1/1944 | Fed. Rep. of Germany ..... 242/85.1 |
| 7609526 | 8/1976 | Fed. Rep. of Germany . |
| 3003309 | 6/1981 | Fed. Rep. of Germany . |
| 3020666 | 12/1981 | Fed. Rep. of Germany . |
| 8203422 | 7/1982 | Fed. Rep. of Germany . |
| 803250 | 11/1937 | France ............................ 339/147 C |
| 254220 | 4/1948 | Switzerland . |
| 2089766 | 6/1982 | United Kingdom . |

*Primary Examiner*—J. Franklin Foss
*Assistant Examiner*—David L. Talbott
*Attorney, Agent, or Firm*—Young & Thompson

[57] ABSTRACT

The retractable winder comprises a support for winding the power cord of an electric flat-iron and two members for retaining the turns of the power cord. The support consists of a series of arms projecting from one face of a plate which constitutes the first retaining member. The second retaining member is constituted by the rear face of the flat-iron casing and provided with guide holes in which the cord-supporting arms are slidably engaged. An elastic traction member consisting of a rubber ring is mounted between the cord-supporting arms and provides a resilient connection between the flat-iron casing and the retaining plate.

7 Claims, 5 Drawing Figures

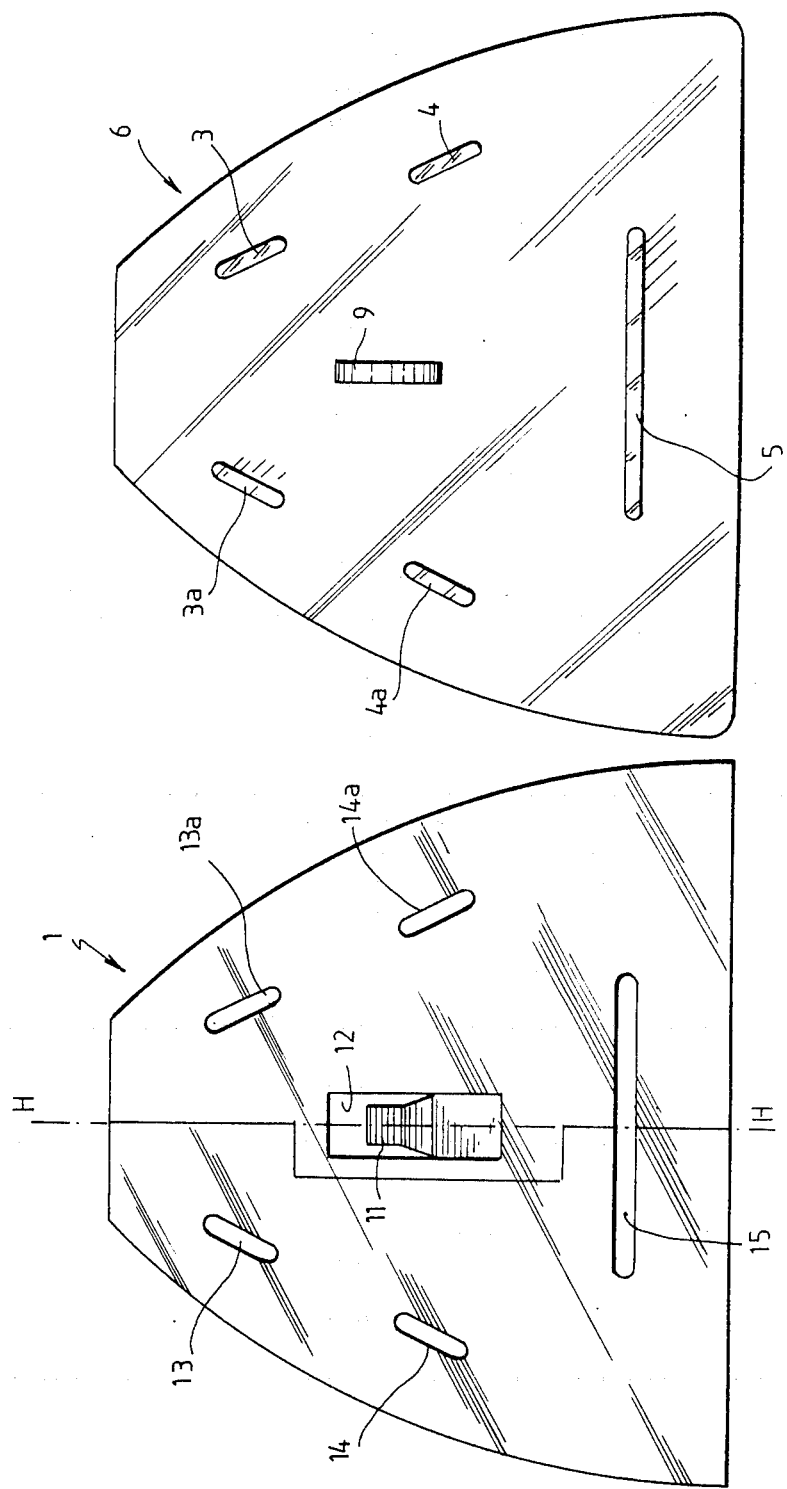

RETRACTABLE WINDER FOR STORING THE POWER CORD OF AN ELECTRIC FLAT-IRON AND AN ELECTRIC FLAT-IRON EQUIPPED WITH A WINDER OF THIS TYPE

This invention relates to a retractable winder for storing the power cord of an electric flat-iron having a sole-plate attached to a casing which covers the sole-plate and is provided with a handle. The winder comprises a support around which is wound the power cord, and two members for retaining the turns of the cord in the direction of their winding axis.

The invention is also directed to an electric flat-iron equipped with the above-mentioned retractable winder.

In the prior art, known winders for storing the power cord of an electric household appliance fall into two different classes. In one class, the power cord is wound on a device of the rotary type comprising a reel, which is an acceptable design concept in the case of bulky appliances such as vacuum cleaners. In the other class (see R.F.A. Utility Model No 8203422), the winder is of the fixed type and has an invariable overall size corresponding to that of the power cord when completely wound. However, a winding support of such large permanent size is not suited to a small domestic appliance such as a flat-iron and is therefore objectionable.

The aim of the present invention is to provide a flat-iron of the above-mentioned type with a retractable winder which does not constitute a hindrance at the time of use of the iron and permits convenient storage of the power cord after use.

The winder contemplated by the invention comprises a support for winding a power cord around said support. Two retaining members are provided for retaining the turns of said power cord in the direction of their winding axis. The first retaining member consists of a plate adapted to carry a series of arms forming a support around which are coiled the turns of power cord carried by the support in the wound state. The second retaining member is constituted by the rear face of the flat-iron casing.

In accordance with a distinctive feature of the invention, the second retaining member is provided with guide holes in which the cord-supporting arms are slidably engaged, and an elastic traction means located between the arms provides a resilient connection between the two retaining members and urges one member towards the other.

By virtue of this arrangement, when the power supply cord is wound on the arms which constitute a support for the turns of wound power cord, the retaining plate moves away from the rear face of the flat-iron casing as the cord-winding operation proceeds. Thus the winder attains its maximum size when the entire length of power cord has been stored on the winder. Conversely, when the power cord is unwound and before using the iron, the retaining plate which is still subjected to the action of the elastic traction means moves automatically toward the rear face of the casing as the turns decrease in number and is finally applied against said rear face when the power cord has been completely unwound. Thus the retaining plate is not liable to constitute any hindrance while the iron is in use.

The arms which perform the function of a winding support or mandrel need in principle be only two in number. However, in order to give the greatest possible length to the turns of cord while reducing the number of turns to a minimum, it is preferable to ensure that the cord-supporting arms constitute together a polygonal winding contour and that they are consequently greater in number. This in any case facilitates displacement of the arms and guards against any danger of jamming as they slide within the guide holes formed in the rear face of the flat-iron casing. It is for this reason that, in a preferred embodiment of the invention, the guide holes as well as the cord-supporting arms engaged within said holes are five in number and arranged as follows:

two guide holes disposed symmetrically with respect to the vertical plane of symmetry of the flat-iron;

two other guide holes disposed with the same symmetry as the two holes mentioned above but at a lower level than these latter;

the fifth guide hole is located at a bottom level below the two pairs of holes mentioned above and the vertical plane of symmetry of the flat-iron intersects said bottom guide hole substantially at its mid-length.

It is accordingly an advantage to ensure that the guide holes and the cord-supporting arms engaged within said holes have cross-sections of elongated shape. Thus, when viewed in projection on a vertical plane at right angles to the vertical plane of symmetry of the flat-iron, each guide-hole cross-section has the shape of an oblong rectangle. The long sides of the four rectangles corresponding to the four guide holes disposed in symmetrical pairs are inclined with respect to the trace of said vertical plane of symmetry. On the other hand, the long side of the rectangle corresponding to the fifth guide hole or elongated slot is substantially perpendicular to said trace.

Thus the efforts to which the winder is subjected when the user initiates winding of the power cord on the cord-supporting arms and when these latter slide within the guide holes are distributed over large contact surfaces irrespective of the direction of the instantaneous effort, with the result that the contact pressure applied by the arms against the walls of the guide holes is never excessive and does not interfere with the displacement of said arms in sliding motion.

The traction means can be constituted by a tension spring of coiled wire. However, any ultimate failure of a device of this type could give rise to many disadvantages both from the point of view of electrical safety and in regard to protection of the article which is being ironed. For this reason it is preferable to ensure that the traction means is a tension spring formed of elastomer and that the retaining plate is provided with a hook on the face located opposite to the flat-iron casing in order to hold the tension spring in position whereas the casing is provided with a fastening member located opposite to the hook.

In the preferred embodiment, said tension spring of elastomer is a simple elastic ring of rubber. The rear face of the flat-iron casing is provided with an opening opposite to the hook and with an arm formed on one edge of said opening. The arm extends into the interior of the casing and is in turn adapted to carry a lug which constitutes said fastening member and is located opposite to the hook.

Thus the point of attachment of the spring at the end nearest the front tip of the iron is located within the casing at a greater distance from the retaining plate. This arrangement enables the spring to exert an even greater force in order to draw the retaining plate against the rear face of the iron when the power cord is in the unwound condition.

Finally, from the point of view of general appearance, it is an advantage to provide the retaining plate and the rear face of the casing with contours having identical shapes and dimensions.

Other features of the invention will be more apparent upon consideration of the following description and accompanying drawings, wherein:

FIG. 3 is a view in elevation showing the rear face of the casing;

FIG. 4 is a view in elevation showing the front face of the retaining plate, namely the face located nearest the iron;

Figure 1:
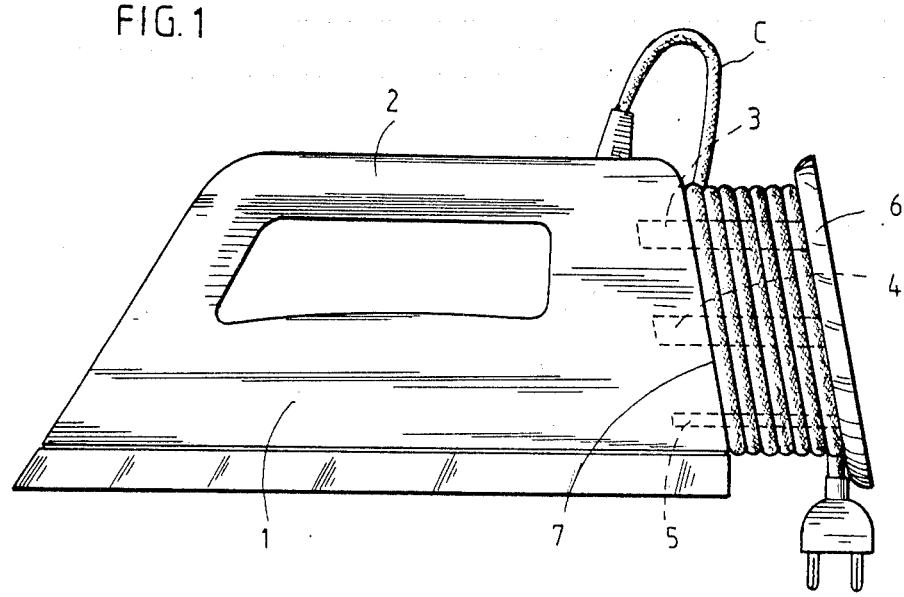
FIG. 1 is a general view of a flat-iron equipped with a winder in accordance with the invention, the power supply being stored on said winder.

In FIG. 1, the current supply cable or power cord C is shown in the wound condition. The turns of the cord are held in position in the direction of their winding axis by two retaining members 6 and 7 which accordingly assume the same functions as the two flanges of a reel. The first retaining member is constituted by a plate 6 and the second retaining member is constituted by the rear face 7 of the casing 1 which covers the heated sole-plate and is provided with a handle 2.

Figure 2:
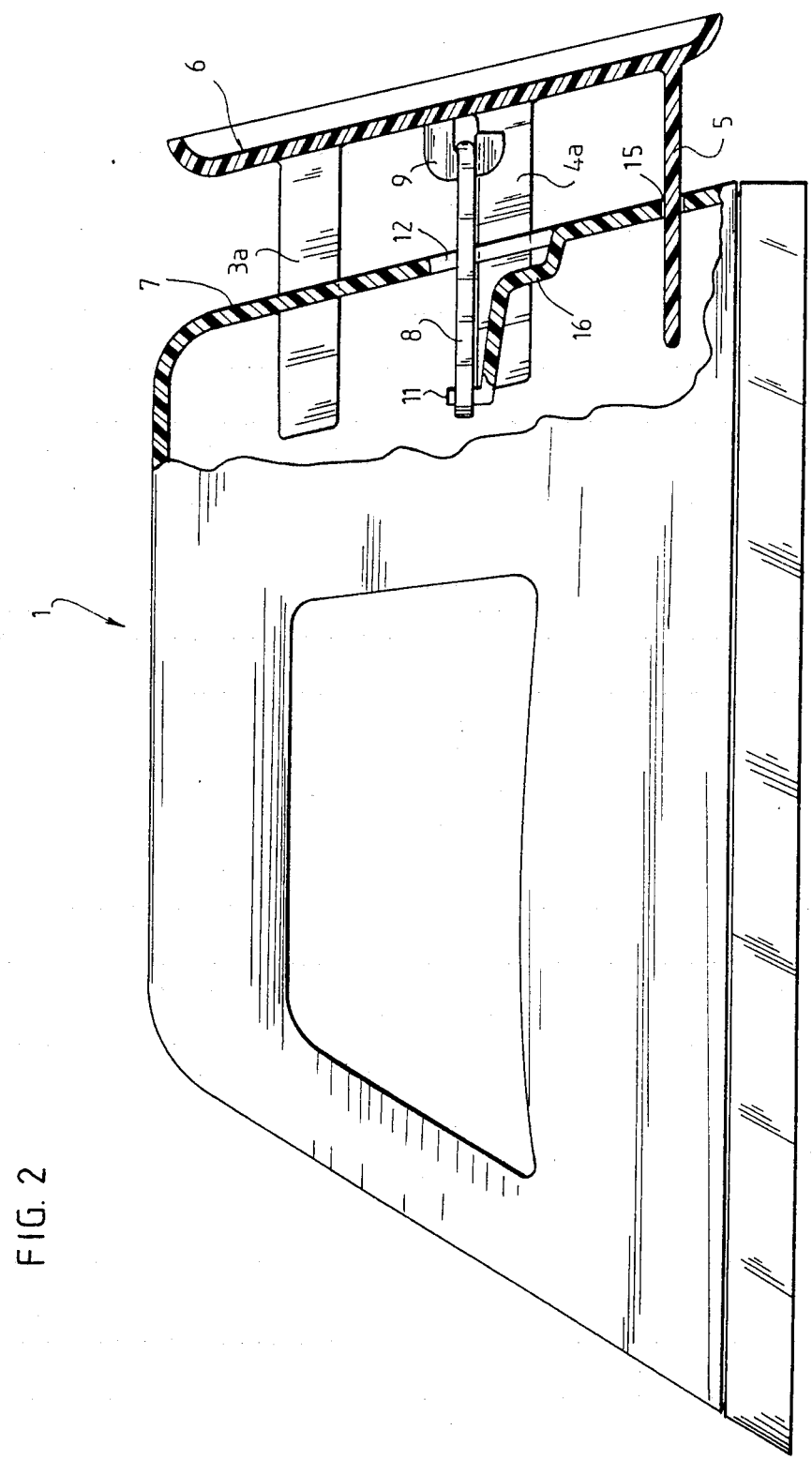
FIG. 2 is a view to a different scale showing the flat-iron casing equipped with the winder in accordance with the invention, this view being taken in partial cross-section along the longitudinal plane of symmetry of the iron.

In accordance with the invention and as shown in FIG. 2 arms 3, 4 and 5 serve to support the turns formed by the power cord in the fully wound state. These arms project from the same face of the retaining plate 6 and are rigidly fixed to this latter. Said arms are capable of sliding displacement within the rear face 7 of the flat-iron casing 1. An elastic traction means 8 consisting of a rubber ring serves to connect the casing 1 to the retaining plate 6 and to urge this latter toward the casing. It is apparent from a combined study of FIGS. 2, 3 and 4 that, in this example, provision is made for five arms slidably mounted within five corresponding guide holes formed in the rear face 7 of the casing. Said guide holes as well as the arms engaged within these latter are arranged as follows:

two guide holes 13 and 13a are disposed symmetrically with respect to the vertical plane of symmetry of the flat-iron (the trace of this plane of symmetry is represented by the vertical axis of symmetry H—H in FIG. 3);

two other guide holes 14, 14a are disposed with the same symmetry as the two holes mentioned above but at a lower level than these latter;

the fifth guide hole 15 is located at a bottom level below the two pairs of holes and the vertical plane of symmetry (line H—H) of the flat-iron intersects said bottom guide hole substantially at its mid-length.

In this example, the guide holes 13-13a, 14-14a, 15 and the corresponding cord-supporting arms 3-3a, 4-4a, 5 which are passed through the guide holes have elongated cross-sections. When viewed in projection on the plane of FIG. 3 or on the plane of FIG. 4, that is, when represented as a projection on a vertical plane at right angles to the vertical plane of symmetry of the iron, each guide-hole cross-section has the shape of an oblong rectangle. The holes shown in the figures are therefore elongated slots whilst the cord-supporting arms are tongues which are capable of sliding within these slots. The long sides of the four rectangles corresponding to the four guide holes or elongated slots disposed in symmetrical pairs 13-13a, 14-14a are inclined with respect to the line H—H of the vertical plane of symmetry. On the other hand, the long side of the rectangle corresponding to the fifth guide hole (elongated slot 15) is substantially perpendicular to said line H—H which intersects the slot at its mid-length.

As shown in particular in FIGS. 2 and 4, the retaining plate 6 is provided with a hook 9 which projects from the plate face located opposite to the casing 1. The tension spring constituted by a rubber ring or so-called elastic band is attached to said hook 9. The casing 1 is provided opposite to said hook with a fastening member 11 to which is attached the other end of the rubber spring 8. A combined study of FIGS. 2 and 3 shows that the rubber band 8 which is engaged in the hook 9 and around the fastening member 11 passes through an opening 12 formed in the rear face 7 of the casing 1. An arm 16 is formed on one edge of said opening (that is to say the bottom edge in the case illustrated in FIG. 2) and extends into the interior of the casing. The end of said arm is adapted to carry a lug constituting the fastening member 11 which is located opposite to the hook 9.

The flat-iron casing 1 is advantageously formed of molded plastic material, in which case it is made up of two parts obtained by injection molding. The two parts are symmetrical except for the fact that the contour of one part is provided on the rear face with a portion which projects beyond the vertical plane of symmetry of the iron in order to form the arm 16 and the fastening lug 11 at the same time as this half-casing. The other half-casing is provided with a complementary contour on the rear face. The joint-line of the two assembled half-casings can be seen in FIG. 3.

Figure 5:
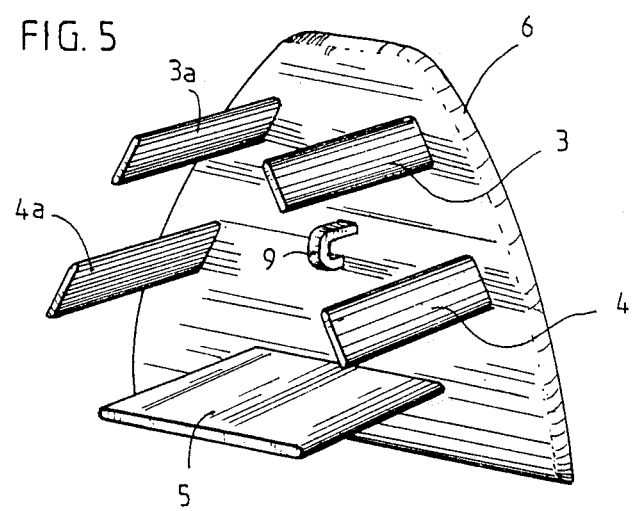
FIG. 5 is a view in perspective showing the movable retaining-plate provided with arms which serve as a cord-winding support.

Similarly, the retaining plate 6 whose contour is advantageously identical with that of the rear face 7 of the casing can be formed in one piece by injection molding of plastic together with the arms 3-3a, 4-4a, 5 and the hook 9. FIG. 5 illustrates a part of this type prior to mounting on the flat-iron casing. As will be readily apparent, the retaining plate 6 could also be provided with open portions or recesses which give it the appearance of a star, for example. Thus the center of the star would carry the hook 9 and the rays of the star would carry the arms 3-3a, 4-4a, 5.

What is claimed is:

1. A retractable winder for storing a power cord of an electric flat-iron having a sole plate secured to a casing covering said sole plate, said winder comprising a first retaining member consisting of a retaining plate (6) to which is rigidly fixed a series of cord-supporting arms (3, 4, 5) projecting from said retaining plate, a second retaining member constituted by a rear wall (7) of said casing, said second retaining member being provided with guide holes (13, 14, 15) in which said cord supporting arms are slidably engaged, and an elastic traction means (8) located between said cord-supporting arms and connected to said first and second retaining members for urging said first retaining member toward said second retaining member.

2. A winder according to claim 1, wherein the guide holes as well as the cord-supporting arms engaged within said holes are five in number and arranged as follows:
- two guide holes disposed symmetrically with respect to the vertical plane of symmetry of the flat-iron;
- two other guide holes disposed with the same symmetry as the two holes aforementioned but at a lower level than these latter;
- the fifth guide hole is located at a bottom level below the two aforementioned pairs of holes and the vertical plane of symmetry of the flat-iron intersects said bottom guide hole substantially at the mid-length thereof.

3. A winder according to claim 2, wherein each cross-section of the guide holes and of the cord-supporting arms engaged within said holes is elongated so as to have the shape of an oblong rectangle when viewed in projection on a vertical plane at right angles to the vertical plane of symmetry of the flat-iron, the long sides of the four rectangles corresponding to the four guide holes disposed in symmetrical pairs being inclined with respect to the trace of said vertical plane of symmetry whilst the long side of the rectangle corresponding to the fifth guide hole is substantially perpendicular to said trace.

4. A winder according to claim 1, wherein said traction means is a spring of elastomer and wherein the retaining plate is provided with a hook on the face located opposite to the flat-iron casing in order to hold said tension spring in position whereas the casing is provided with a fastening member located opposite to said hook.

5. A winder according to claim 4, wherein said tension spring of elastomer is an elastic ring of rubber and wherein the rear face of the flat-iron casing is provided with an opening opposite to the hook and with an arm formed on one edge of said opening, said arm being adapted to extend into the interior of the casing and to carry a lug which constitutes said fastening member and is located opposite to said hook.

6. A winder according to claim 1, wherein the contours of the retaining plate and of the rear face of the flat-iron casing have identical shapes and dimensions.

7. An electric flat-iron comprising a retractable winder according to claim 1.

* * * * *